United States Patent [19]

Dumas

[11] 4,354,096

[45] Oct. 12, 1982

[54] HEATING ELEMENTS AND THERMOSTATS FOR USE IN THE BREEDING OF FISH FOR AQUARIA

[75] Inventor: Jean Claude Dumas, Auriol, France

[73] Assignee: Gloria S.A., Paris, France

[21] Appl. No.: 229,721

[22] Filed: Jan. 28, 1981

[30] Foreign Application Priority Data

Jan. 29, 1980 [FR] France ................... 80 01875

[51] Int. Cl.³ .............................. H05B 3/36
[52] U.S. Cl. ................... 219/523; 219/331; 219/504; 219/528; 219/544; 338/22 R; 338/212; 119/5
[58] Field of Search ............... 219/316, 318, 323, 331, 219/324, 504, 505, 523, 516, 528, 538, 541, 543, 544, 549, 553; 338/22 R, 22 SS, 212; 119/5

[56] References Cited

U.S. PATENT DOCUMENTS

| | | | |
|---|---|---|---|
| 3,796,858 | 3/1974 | Cohn | 219/331 |
| 3,890,486 | 6/1975 | Fitzgerald | 219/523 |
| 4,032,751 | 6/1977 | Youtsey et al. | 219/538 |
| 4,104,509 | 8/1978 | Bokestal et al. | 219/544 |

FOREIGN PATENT DOCUMENTS

| | | |
|---|---|---|
| 957965 | 2/1957 | Fed. Rep. of Germany . |
| 2401585 | 3/1959 | France . |
| 2417234 | 9/1979 | France . |
| 661152 | 11/1951 | United Kingdom . |

*Primary Examiner*—Volodymyr Y. Mayewsky
*Attorney, Agent, or Firm*—Bucknam and Archer

[57] ABSTRACT

The present invention relates to a heating element usable in particular in aquaria, characterized in that it is constituted by an electrical element proper, coated with a moldable and waterproof heat-conducting material, such as a resin preferably, which can be shaped by known methods.

9 Claims, No Drawings

HEATING ELEMENTS AND THERMOSTATS FOR USE IN THE BREEDING OF FISH FOR AQUARIA

The present invention relates to new heating elements and the thermostats using said elements, usable in the breeding of fish for aquaria.

It is a known fact that aquaria need to be adequately heated and that the selected operating temperature should always be kept as constant as possible. A number of devices already exist on the market to this effect, but the known devices all present major disadvantages which, in practice, result in too much inaccuracy in the temperature control and regulation and consequently in injury to the fish and/or the flora living in the aquarium.

For example, the heating elements used for heating the water in aquaria are normally placed inside a glass tube. Such glass casings are delicate; moreover, the calories are transmitted from the said element to the water through the air surrounding the element and through the glass which is an insulating material. It is conceivable, in the circumstances, the heating of the aquarium water by the said elements in order to keep the temperature of the said water at a given value, is done in conditions that are thermally bad, on the one hand, and dangerous for the user on the other hand (because of the fragility of the casing).

The present invention relates first of all to a new heating element for use in aquaria, characterized in that it is constituted by an element proper obtained by the use of particulate conducting materials made consistent and capable of being shaped by way of a hydrocarbonic polymer matrix, the shaped product being made conductor according to a selected value by controlled heat destruction of the said hydrocarbonic polymer, the said element being coated with a water-proof and moldable heat-conducting material, said material being preferably a resin, which can be shaped by known methods.

Like this, to produce the heating elements, conducting particles will be used as starting element (for example, metallic and/or carbon particles) which will be dispersed in a hydrocarbonic polymer. The resulting mixture will be shaped by known methods, for example by sintering. Then the shaped material will be heated to the adequate temperature for causing the controlled destruction of the polymer and for creating a shaped material which conducts electricity according to the desired value.

The technique described hereinabove for producing an electricity-conducting material which can be shaped is known per se, but, whilst this material is itself coated with a heat-carrying water-proof plastic component which is compatible with the heating element produced this way, a product is obtained which, whilst being perfectly insulating electrically vis-a-vis the outside, is on the inside a good conductor of heat and electricity, this making it usable according to the invention, in the breeding of fish in aquaria or in any other similar type application, which was never recommended.

Although the said electricity-conducting material can be used in this form as a heating element, it is thus preferred according to the invention, to produce the heating element by coating the electrically conductive material; besides the electrical insulation which is obtained this way and which is really necessary if the heating element is to be immersed in water, improved charactistics of the element proper are obtained with this method: working protected from the air, and therefore from oxidation, they are less delicate and withstand higher working temperatures. The said coating consists in depositing a moldable compound on the shaped heating element. Said compound should have the following properties:

be water-proof under working temperatures,
be adaptable to the shape which has been given to the heating element, and preferably, be itself moldable, i.e. take up the required external shape,
be heat-conducting and electrically insulating.

The coating materials that can be used are preferably resins, such as for example of the epoxy or polyurethane or polyester type, which have been made heat-conducting by incorporating suitable fillers thereto, such as for example, metallic oxides. Such resins, loaded and made heat-conducting in this way, are known.

Thus, the heating elements according to the invention are constituted by a heating element proper and by a coating of heat-conducting material, which coating can have any thickness provided that its heat-carrying properties remain adequate enough to prevent the element proper from going beyond its operating temperatures.

The advantage of the new heating elements used for heating aquaria resides, on the one hand, in the fact that they form a compact, water-proof unit without there being any air between the heating element proper and the water, and, on the other hand, in the fact that they are "moldable", i.e. that they can adapt the most varied shapes. Thus, owing to the invention, the said heating elements can take on, not only a tubular or parallelepipedal shape, but also the shape of blocks, similar to the "rocks" used to decorate aquaria or of relatively thin plates placed for example against the back wall of the aquarium.

Another advantage of these new heating elements, although not a characteristic one, is that they can be supplied with either A.C. or D.C. current, of normal voltage, or of low voltage (6 or 12 V), whilst supplying the necessary calories. Thus it was noted that the presence of carbon creates an increase of the value of the heating element as and when the temperature of the said element increases; this fact is an advantage when the heating method using these elements is allowed a certain automatic regulation. Finally, the time required to put the electrical current through this type of element is much longer than through a metal wire for example, this preventing said elements from undergoing repeated thermal shocks in the case of a pulse utilization (such as coupled with a thermostat) and giving them a longer working life.

However, the aforedescribed coating can also be produced, according to the invention, around for example, a metal wire, which latter can also have been protected beforehand by a ceramic molding (for example) according to known methods; or around any other type of heating element compatible with this coating method. The heating elements obtained this way, although they do not show all the properties of the prior ones, remain usable in the breeding of fish in aquaria, with the advantages that have been cited for the case of the creation of molded elements, and will be described hereinafter with reference to the case of the creation of compact and likewise molded heating and thermostat combined apparatus.

To produce a thermostat, i.e. a temperature-regulating apparatus, it is necessary to combine the new heating elements according to the invention with a device for measuring the temperature of the aquarium and/or the outside temperature at any moment, and with a device permitting to control the power supply to the heating element or to switch it off in relation to the measured temperature. These two types of devices exist and can be used with the heating elements according to the invention.

However, to produce compact thermostats and to overcome the difficulties encountered in the use of current devices, an electronic control device has been developed for controlling the functioning of the heating elements according to the invention.

The principle of this control device is that the power supply to the heating element is effected according to a mathematical function of the temperature difference between the measured temperature of the aquarium and the temperature required for the aquarium, which latter can be either adjusted at will by the user, or programmed at construction time. Said function can for example be a function of proportionality. For its part, the variable element which will be a function of the temperature difference and which will be controlled by the electronic device can be, for example, the power supplied to the heating element or the duration of that supply; in both cases, the power of the heating system will thus be permanently controlled.

The electronic devices which permit to achieve this control of the functioning of the heating element proportionally to a temperature difference are known per se and will not be described hereinafter.

The fact of using such a regulation mode in the conditions described hereinabove offers a considerable advantage in the required application, since the optimal temperature displayed will be reached gradually, asymptotically, and cannot in any way be exceeded; thus, the fish present in the aquarium cannot be subjected to any overheatings which could endanger their health. To arrive at this result, in the case where the power available is limited, the type of control whereby the functioning of the heating element is controlled proportionally to the temperature difference must be restricted to an area where the temperature of the aquarium is relatively close to the required temperature, which will be mostly the case during normal operation. When, for any reason whatsoever, the temperature of the aquarium is very much below the required temperature, the control of the heating of the elements must release in full the available power.

The heating elements according to the invention can be supplied with alternating or direct current; a characteristic of the invention is that, when the current used is A.C., the switching on and switching off of the heating element will always be effected, whereas the intensity of the alternating current is cancelled. This characteristic, which can be obtained by known electronic means, is important as it permits, on the one hand, to increase the working life of the devices according to the invention, and on the other hand it prevent the emission of interferences.

The electronic controls can be mounted and delivered independently of the heating elements used for heating and connected thereto when the aquarium is permanently installed; but they can also and advantageously be integral with these heating elements or be joined thereto when under construction so as to form a suitably shaped thermostat usable directly without any particular assembling.

A particularly advantageous embodiment of the invention applied to the breeding of fish in aquaria is that wherein a temperature measuring device is integrated to the covering molding of the element. If it is placed so that the inside temperature of the heating element can be read, it makes it possible, associated to an electronic cut-off device, to avoid the failure of the heating element if the latter reaches too high an inside temperature (for example in case of accidental operation in the open air). If on the contrary it is judiciously heat-insulated from the heating element, it indicates the temperature of the water and acts as a guide for the regulation (external). The coupling of two measuring elements (internal and external) permits both to regulate and to cut off the supply, thus avoiding a failure of the heating element in the case of operation in the open.

This safety can also be achieved without using heat as vector of information. It will be possible, for example, to detect the presence of water to authorize the operation of the heating element (known method to be claimed by the breeding of fish in aquaria). Then, the electronic controls can even be embedded in a plastic block, which block is connected or made fast with the block of heating elements.

Thus, it is possible, according to the invention, to re-group into one or more monoblock apparatus, the devices permitting to heat up the aquarium, the measurement of the temperatures and the electronic controls. Thus, this or these monoblock apparatus can be given operational qualities (mainly waterproofness and safety) or decorative or other qualities.

The following non-restrictive example illustrates the invention. The object is to produce a thermostated heating for an aquarium as follows.

In a molded epoxy casing (resin of the type MM 2050 of EMERSON-CUMING) is placed an electronic regulating member consisting of a control chain using the following diagram.

Said electronic assembly comprises, in combination with two thermistors, one reading the inside temperature $t_1$ of the associated heating element, and the other, the external temperature $t_2$ of the water;
an electronic circuit $c_1$ permitting to compare the temperature $t_1$ with a selected maximum temperature (70° for example),
an electronic circuit $c_2$ permitting to compare the temperature $t_2$ with the selected temperature for the water of the aquarium (adjusted by the user on a potentiometer),
a TRIAC, which controls the supply of electrical power to the heating element.

The electronic circuit $c_2$ is designed and used so that, when the temperature difference between the measured temperature $t_2$ and the selected temperature is greater than a certain value, the heating element receives the totality of the electric heating current and that, when the said temperature difference is less than a certain value, the heating element receives electrical pulses whose duration is proportional to the temperature difference.

Moreover, an added safety is obtained by the circuit $c_1$ which cuts off the supply to the heating element when $t_1$ is greater than the maximum value arbitrarily accepted (70° in our example).

The electronic assembly defined hereinabove is provided with the means necessary to its electrical supply.

Said electronic assembly being in position, an epoxy resin is then poured in, to complete the casing and to transform it into a waterproof monoblock object wherefrom issue the mains or battery connecting wires and the connecting wires to the heating element and to the thermistors.

On the top of the casing, a luminous diode remains visible after the molding, which diode indicates the phases of operation of the apparatus, as well as the axis of the regulation potentiometer whose movability has been protected from the molding by means of an O-ring which, in addition, ensures the tightness of that opening. A control knob completes the system.

As regards the heating element, this is constructed in a molded shell in heat-carrying epoxy of the type MT 2850 of EMERSON-CUMING.

Inside the said shell are placed two thermoplastic heating elements and one thermistor which, in turn, will be molded with the same resin to form a also a monoblock. The said thermistor measures the temperature t1. A second thermistor measuring the temperature t2 is placed on the wire connecting the thermostat to the heating element, with a subsequent molding whilst ensuring tightness.

The heating elements proper are constituted by a powder mixture consisting:
of a phenol-formaldehyde resin
of a carbon black powder
of a copper powder.

The proportion of the different constituents permits to obtain a heating element of predetermined value.

An example of proportion is as follows: 25% phenol-formaldehyde resin, 50% carbon black, 25% copper powder.

After mixing, the powder is then sintered under a pressure of 10 t then forming a rigid bar, which can be undulated by when molded in order to increase the heat dispersion surface.

After compressing, the bar is then baked at a temperature below 200°. During said baking, the bond is destroyed, giving rise to a matrix containing the ternary compound.

The resulting bar has become conductive and constitutes a heating element of high quality, which can be connected due to two eyelets in copper which have been carefully placed in the powder mixture before compression.

Said heating element which, shielded from the air (and this is the case in the epoxy molding) can be used up to between 170° and 180° (core temperature) has the added advantage, when applied to the breeding of fish in aquaria, to see its resistance increase as the temperature rises.

This phenomenon, which is exploited, constitutes an automatic regulation of the temperature of the heating element.

I claim:

1. In an electrical heating element useable in an aquarium, the improvement which comprises an electrical resistance containing conductive particles mixed with a hydrocarbonic polymer, said resistance having been shaped and subjected to a controlled thermal action to obtain a given electrical conduction of said mixture of conductive particles and polymer; and a coating of an electrically insulating material disposed in surrounding relation to said electrical resistance, said insulating material being a thermoplastic material which is heat-conductive and defines a waterproof and moldable coating.

2. The improvement according to claim 1 including a temperature measuring device and cut-off circuit means connected to said temperature measuring device to prevent overheating of the heating element.

3. The improvement according to claim 1 including a water-detecting device and a cut-off circuit connected to said water-detecting device for response thereto to regulate operation of the heating element for powered operation only when surrounded by water.

4. The improvement according to claim 1 including means disposed to measure temperature outside the heating element.

5. The improvement according to claim 1 including control means connected to said heating element to regulate the supply of electrical power thereto in accordance with a mathematical function of the temperature difference between real temperature of the aquarium and the required temperature for the aquarium.

6. The improvement according to claim 1 including means operable to control the temperature of the aquarium.

7. The improvement according to claim 1 including means operable to measure the internal temperature of the heating element.

8. The improvement according to claim 1 including means operable to control the electric power supplied to the heating element in accordance with a measuring device.

9. The improvement according to claim 1 including means operable to detect water around said heating element.

* * * * *